Patented Sept. 19, 1944

2,358,336

UNITED STATES PATENT OFFICE 2,358,336

PREPARATION OF VITAMIN COMPOSITIONS

Elmer J. Lawson and Hervey C. Parke, Detroit, Mich., assignors to Parke, Davis & Company, Detroit, Mich., a corporation of Michigan No Drawing. Application August 18, 1941, Serial No. 407,358

5 Claims. (Cl. 260—534)

This invention relates to vitamin compositions and their preparation. More particularly, this invention relates to the preparation of pantothenic acid, a vitamin of the B complex occurring in liver and in yeast.

Pantothenic acid has the following structural formula,

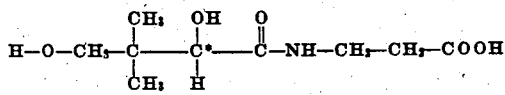

and may be said to be the $\beta$-alanide of $\alpha,\gamma$-dihydroxy-$\beta,\beta$-dimethylbutyric acid. Pantothenic acid and its salts, almost all of which are very soluble in water, are effective in stimulating the growth of yeast, bacteria and various other organisms.

It will be noticed that the carbon atom marked with an asterisk (*) is asymmetric. Of the two enantiomorphous forms, only the dextrorotatory (+) form is biologically active.

This invention has for its object an improved process for the preparation of pantothenic acid and its derivatives.

According to our invention, we prepare salts of pantothenic acid by reacting $\beta$-alanine and a salt of $\alpha,\gamma$-dihydroxy-$\beta,\beta$-dimethylbutyric acid at elevated temperatures, best in the neighborhood of 150–200° C. The salts of $\alpha,\gamma$-dihydroxy-$\beta,\beta$-dimethylbutyric acid are prepared by reacting $\alpha$-hydroxy-$\beta,\beta$-dimethyl-$\gamma$-butyrolactone with a strong base. We prefer to use the alkali or alkaline earth metal salts in this process thereby obtaining alkali or alkaline earth metal salts of $\alpha,\gamma$-dihydroxy-$\beta,\beta$-dimethylbutyric acid. While the reaction of the $\beta$-alanine with the salt of $\alpha,\gamma$-dihydroxy-$\beta,\beta$-dimethylbutyric acid may be effected by heating the two components in the presence of a solvent such as ethylene glycol, quinoline, tetralin or other inert solvents, we prefer to conduct the reaction simply by fusing the two components in the absence of any solvent.

Our invention may be further illustrated by the following examples:

Example 1

A. A solution of 22.02 g. of racemic $\alpha$-hydroxy-$\beta,\beta$-dimethyl-$\gamma$-butyrolactone and 25 g. of sodium hydroxide in 110 cc. of water is refluxed for half an hour, cooled, and saturated with carbon dioxide. The solution is evaporated to dryness in vacuo, and the solid residue extracted with 350 cc. of hot methanol in several portions. The methanolic extracts are combined, concentrated to a volume of 50 cc. and allowed to stand. The next morning the slight deposit which has formed is removed, and the clear solution diluted with about 800 cc. of warm acetone. On cooling, the racemic sodium $\alpha,\gamma$-dihydroxy-$\beta,\beta$-dimethylbutyrate crystallizes. It melts at 190° C. and is not hygroscopic.

B. A mixture of 1.70 g. of racemic sodium $\alpha,\gamma$-dihydroxy-$\beta,\beta$-dimethylbutyrate and 0.89 g. of $\beta$-alanine is heated to 175° C., at which point fusion takes place. The fused mass is maintained at 150° C. for an hour and then allowed to cool in a desiccator. The glassy product may be assayed by the bacterial growth method; the activity corresponds to a 91% yield of racemic sodium pantothenate.

Example 2

A. (—)$\alpha$-hydroxy-$\beta,\beta$-dimethyl-$\gamma$-butyrolactone is obtained by resolution of the racemic lactone with quinine.

B. A solution of 13 g. of (—)$\alpha$-hydroxy-$\beta,\beta$-dimethyl-$\gamma$-butyrolactone and 40 g. of barium hydroxide octahydrate in 200 cc. of water is refluxed for two hours, cooled, and the excess barium precipitated with a stream of carbon dioxide. The mixture is filtered and the filtrate evaporated to dryness. The residue of barium (+)-$\alpha,\gamma$-dihydroxy-$\beta,\beta$-dimethylbutyrate is purified by recrystallization from water-acetone. The salt has M. P. 213–215° C. and $[\alpha]_D^{24}=+7.4°$ (C=5% in water).

C. Sodium (+)-$\alpha,\gamma$-dihydroxy-$\beta,\beta$-dimethylbutyrate is prepared by mixing solutions of equivalent amounts of the barium salt above and sodium sulfate in aqueous solution. The precipitated barium sulfate is removed by filtration or centrifuging and the clear liquor evaporated to dryness. The residue is dissolved in a small amount of methanol and crystallized by addition of a large excess of acetone. The desired sodium salt may separate at first as an oil, but it rapidly crystallizes and then may be cooled and purified by recrystallization from methanol-acetone. Thus, sodium (+)-$\alpha,\gamma$-dihydroxy-$\beta,\beta$-dimethylbutyrate is obtained as hygroscopic crystals of M. P. 166–171° C., $[\alpha]_D^{29}=+8.4°$ (C=4% in water).

Sometimes, especially if the solution is allowed to crystallize slowly by adding only a slight excess of acetone to the methanolic solution, the salt is obtained in entirely different crystalline form, M. P. 99–101° C., which is not hygroscopic. This form has the same specific rotation as the higher melting form and is apparently an allotropic modification. Both forms are definitely crystalline as is readily seen by examining them under the polarizing microscope.

D. A mixture of 3.4 g. of sodium (+)-α,γ-dihydroxy-β,β-dimethylbutyrate and 1.78 g. of β-alanine is fused at 180° C. for 15 minutes and then cooled quickly. The resulting glass is sodium d-pantothenate. It may be purified by fractional precipitation from alcohol-ether solutions or by crystallization from absolute alcohol.

Example 3

A. A solution of 50 g. of racemic α-dihydroxy-β,β-dimethyl-γ-butyrolactone and 65 g. of barium hydroxide octahydrate in 350 cc. of water is refluxed for half an hour, cooled, saturated with carbon dioxide, and filtered. The clear filtrate is concentrated to a volume of about 200 cc. and cooled, whereupon it sets to a crystalline mass. This is triturated with acetone and collected. Thus, there is obtained racemic barium α,γ-dihydroxy-β,β-dimethylbutyrate monohydrate.

B. Racemic sodium α,γ-dihydroxy-β,β-dimethylbutyrate may be prepared according to Example 1A. Alternatively, it may be prepared by mixing hot aqueous solution of equimolar amounts of racemic barium α,γ-dihydroxy-β,β-dimethylbutyrate monohydrate and sodium sulfate, removing the barium sulfate by filtration, evaporating the filtrate to dryness and crystallizing the residue from acetone-methanol.

C. A solution of 0.85 g. of racemic sodium α,γ-dihydroxy-β,β-dimethylbutyrate and 0.445 g. of β-alanine in 10 cc. of ethylene glycol is refluxed for 20 minutes, after which the glycol is removed by distillation under reduced pressure. The residue is racemic sodium pantothenate.

Instead of using sodium α,γ-dihydroxy-β,β-dimethylbutyrate in the above reaction, barium α,γ-dihydroxy-β,β-dimethylbutyrate may be used thereby obtaining racemic barium pantothenate.

Example 4

A mixture of 1.124 g. of barium α,γ-dihydroxy-β,β-dimethylbutyrate and 0.445 g. of β-alanine is fused in an oil bath at 200° C. The temperature is allowed to drop slowly to 180° C. over a period of 15 minutes, after which the fused mixture is cooled and pulverized. This is racemic barium pantothenate.

What we claim as our invention is:

1. Process for preparing a salt of pantothenic acid which comprises reacting in non-aqueous phase substantially equivalent amounts of β-alanine and a salt of α,γ-dihydroxy-β,β-dimethylbutyric acid at 150–200° C.

2. Process for preparing a salt of pantothenic acid which comprises reacting in non-aqueous phase substantially equivalent amounts of β-alanine and a member of the class consisting of alkali metal α,γ-dihydroxy-β,β-dimethylbutyrates and alkaline earth metal α,γ-dihydroxy-β,β-dimethylbutyrates at 150–200° C.

3. Process for preparing racemic sodium pantothenate which comprises reacting in non-aqueous phase substantially equivalent amounts of β-alanine and racemic sodium α,γ-dihydroxy-β,β-dimethylbutyrate at 150–200° C.

4. Process for preparing sodium d-pantothenate which comprises reacting in non-aqueous phase substantially equivalent amounts of β-alanine and sodium d-α,γ-dihydroxy-β,β-dimethylbutyrate at 150–200° C.

5. Process for preparing sodium d-pantothenate which comprises fusing substantially equivalent amounts of β-alanine and sodium d-α,γ-dihydroxy-β,β-dimethylbutyrate for approximately fifteen minutes at 170–180° C.

ELMER J. LAWSON.
HERVEY C. PARKE.